United States Patent [19]
Elbaum

[11] Patent Number: 6,010,067
[45] Date of Patent: *Jan. 4, 2000

[54] MOBILE FUNDS TRANSACTION DEVICE FOR TRANSFERRING FUNDS BETWEEN REMOTE BANKING FACILITIES

[75] Inventor: Hector Daniel Elbaum, Doncaster East, Australia

[73] Assignee: Dynamic Data Systems Pty. Ltd., Melbourne, Australia

[ * ] Notice: This patent issued on a continued prosecution application filed under 37 CFR 1.53(d), and is subject to the twenty year patent term provisions of 35 U.S.C. 154(a)(2).

[21] Appl. No.: 08/676,361

[22] PCT Filed: May 13, 1994

[86] PCT No.: PCT/AU94/00247

§ 371 Date: Jul. 22, 1996

§ 102(e) Date: Jul. 22, 1996

[87] PCT Pub. No.: WO95/20195

PCT Pub. Date: Jul. 27, 1995

[30] Foreign Application Priority Data

Jan. 25, 1994 [AU] Australia ................................ PM 3507

[51] Int. Cl.[7] ......................................................... G06K 5/00
[52] U.S. Cl. ............................................. 235/380; 235/379
[58] Field of Search ..................................... 235/379, 380

[56] References Cited

U.S. PATENT DOCUMENTS

| 4,536,647 | 8/1985 | Atalla et al. ............................. 235/379 |
| 4,689,478 | 8/1987 | Hale et al. ................................ 235/380 |

(List continued on next page.)

FOREIGN PATENT DOCUMENTS

| 4226589 | 4/1990 | Australia . |
| 7844191 | 12/1991 | Australia . |
| 2896992 | 6/1993 | Australia . |
| 27392/92 | 4/1995 | Australia . |
| 8173294 | 7/1995 | Australia . |
| 0484198 | 5/1992 | European Pat. Off. . |
| 546584 | 6/1993 | European Pat. Off. . |
| 5128118 | 5/1993 | Japan . |
| WO 9107042 | 5/1991 | WIPO . |
| WO 9306564 | 4/1993 | WIPO . |
| WO9308545 | 4/1993 | WIPO . |
| WO9411849 | 5/1994 | WIPO . |

OTHER PUBLICATIONS

Bartley, George, "Business Mobile Communications," Ericsson Communications Ltd, Feb. 8, 1991.
Lane, Tony, "Latest Developments in CT2 and CT2 Plus," Motorola Inc., Florida, USA, publication date unknown.
Nordberg, Tommy, "The Future of Mobiles—Plannings for PCNs," Ericsson Radio Systems AB Sweden, publication date unknown.

(List continued on next page.)

*Primary Examiner*—Donald Hajec
*Assistant Examiner*—Douglas X. Rodriguez
*Attorney, Agent, or Firm*—Greer, Burns & Crain Ltd.

[57] ABSTRACT

A mobile funds transaction device for transferring funds between one bank account or credit facility and another bank account or credit facility, the device having: a card reader device; a PINpad device with an encryption system; a modem device; a communication interface device connected with the modem device; an output report device; a wireless communication device; and a central processing device (CPU) to which are connected the above-listed devices. The CPU is programmed to store merchant identifying data of the owner/leasee of the device and to activate the PINpad device so a user can enter confidential identifying information to the CPU. The user then activates a communication connection via the modem device and the interface device to transmit the stored user entered data as well as transmit the merchant identifying data of the owner/leasee of the device, so that funds can be transferred from the user's bank account or credit or debit card to the owner/leasee's bank account or vice versa and to provide signals to the output report device confirming the transaction or other information relating to the transaction

4 Claims, 13 Drawing Sheets

U.S. PATENT DOCUMENTS

| | | |
|---|---|---|
| 4,727,243 | 2/1988 | Savar ................................................ 235/379 |
| 4,776,003 | 10/1988 | Harris ................................................ 379/91 |
| 4,777,646 | 10/1988 | Harris ................................................ 379/91 |
| 4,831,647 | 5/1989 | D'Avello et al. .................................. 379/91 |
| 4,860,341 | 8/1989 | D'Avello et al. .................................. 379/91 |
| 4,933,971 | 6/1990 | Bestock et al. ................................... 380/44 |
| 4,965,568 | 10/1990 | Atalla et al. .................................. 340/825.34 |
| 4,967,365 | 10/1990 | Hampi et al. ................................. 364/474.15 |
| 5,038,284 | 8/1991 | Kramer ............................................ 364/408 |
| 5,144,649 | 9/1992 | Zicker et al. .................................... 379/59 |
| 5,149,945 | 9/1992 | Johnson et al. ................................. 235/380 |
| 5,175,416 | 12/1992 | Mansvelt et al. ............................... 235/379 |
| 5,202,825 | 4/1993 | Miller et al. .................................... 364/405 |
| 5,208,446 | 5/1993 | Martinez .......................................... 235/380 |
| 5,220,501 | 6/1993 | Lawlor et al. ................................... 364/408 |
| 5,220,593 | 6/1993 | Zicker et al. .................................... 379/59 |
| 5,221,838 | 6/1993 | Gutman et al. ................................. 235/379 |
| 5,231,569 | 7/1993 | Myatt et al. ..................................... 364/408 |
| 5,243,645 | 9/1993 | Bissell et al. ................................... 379/211 |
| 5,272,747 | 12/1993 | Meads ............................................. 379/59 |
| 5,294,782 | 3/1994 | Kumar ............................................. 235/462 |
| 5,321,840 | 6/1994 | Ahlin et al. ..................................... 395/700 |
| 5,325,418 | 6/1994 | McGregor et al. ............................. 379/59 |
| 5,334,821 | 8/1994 | Campo et al. ................................... 235/380 |
| 5,387,784 | 2/1995 | Sarradin .......................................... 235/380 |
| 5,388,148 | 2/1995 | Seiderman ....................................... 379/59 |
| 5,408,077 | 4/1995 | Campo et al. ................................... 235/380 |
| 5,408,078 | 4/1995 | Campo et al. ................................... 235/380 |
| 5,408,513 | 4/1995 | Busch, Jr. et al. .............................. 379/59 |
| 5,550,897 | 8/1996 | Seiderman ....................................... 379/59 |

OTHER PUBLICATIONS

Leopold, Raymond, "Mobile Communications by Satellite—Competitor or Complement to Terrestrial Systems?," Motorola Satellite Communication, publication date unknown.

Cahill, Martin, "Security: What You Need to Know," Motorola Melbourne, publication date unknown.

MacDonald, Jamie, "Data Over Cellular & The Mobile Office; What Are The Benefits?," Telecom Cellular Ltd, 1992.

"AS2805 EFTPOS Terminal Specification Version 3.3" Electronic Transaction Services Limited, ASB Bank Computer Centre, new Zealand, Nov. 22, 1992.

"Telecom Transaction Service Interface Specifications," Service Projects, Telecom networks and Operations, Telecom Networks House, 68–86 Jervois Quay, Wellington, Jan. 10, 1992.

Australian Standard AS 2805.1, "Electronic Funds Transfer—Requirements for Interfaces," Part 1: Communications, 1991, pp. 1–24.

Australian Standard AS 2805.2, "Electronic Funds Transfer—Requirements for Interfaces," Part II: Message Structure, Format and Content, 1986, pp. 1–40.

"When the Going Gets Tough—The Tough Go Mobile Data," *Databurst*, Mobile Data International, vol. 5, No. 1, Winter 1990, pp. 1–8.

"Donuts Very Silly Guide to EFT," Nov. 1992, pp. 1–9.

Letter from Mark C. Nicolau, Akyman Financial Services Pty Ltd, to Greg Young, Philps Mobile Communication Systems, dated Oct. 16, 1993.

Cantrell, "The (Air) Waves of the Future", *The Automated Banker*, Mar. 1991, pp. 23–24.

Davie et al., "A Cellular Packet Radio Data Network", *Electronics & Communication Engineering Journal*, Jun. 1991, pp. 138–143.

"Restaurants Order with Wireless POS System—NEC: Unveils wireless POS system for restaurants", *Office Equipment & Products*, Dec. 1991, p. 28.

"Cellular Data & BT North America Debut Wireless POS", *Wireless World*, Feb. 10, 1992, 2 Pages.

Robins, "Wireless POS Marks & Spencer Plans 100–Store Rollout", *Stores*, May 1992, pp. 38–39.

"Will Wireless Take Off? Mervyn's, Eddie Bauer Test Concept", *Chain Store Age Executive*, Jul. 1992, pp. 50, 52.

"Portable POS: Any Time, Anywhere", *Chain Store Age Executive*, Aug. 1992, p. 65.

"Technology Briefs: Wal–Mart Installs Telxon RF Network", *Discount Store News*, Nov. 16, 1992. p. 10.

"POS of the Future: Technology Trends", Chain Store Age Executive Edition, Dec. 1992, 2 pages.

"POS Spectrum", *POS News*, Mar. 1, 1993, 3 pages.

Shore, "IBM updates point–of–sale terminals—International Business Machines: Releases 4690 Store System POS terminals", *Computer Reseller News*, Jun. 7, 1993, p. 22.

"Wireless Systems: Achieving High Flexibility, Seamlessly—NCR WaveLAN wireless sys used by Younkers & JC Penney", *Chain Store Age Executive Edition*, Nov. 1993, 2 pages.

"Case Study: Younkers Goes Wireless—Younkers: Uses NCR's WaveLAN as wireless POS sys upgrade", *Chain Store Age Executive Edition*, Nov. 1993, 2 pages.

"Saks Finds Intangible RF Benefits", *Chain Store Age Executive Edition*, Nov. 1993, 2 pages.

Robins, "Wireless POS Systems", *Stores*, Feb. 1994, pp. 47–48.

| PART DESCRIPTION | PART NUMBER |
|---|---|
| 10μF Capacitor | C1 |
| 10μF Capacitor | C2 |
| 10μF Capacitor | C3 |
| 10μF Capacitor | C4 |
| 0.1μF Capacitor Ceramic Disk | C5 |
| 39nF Capacitor | C6 |
| 39nF Capacitor | C7 |
| 10μF Capacitor | C8 |
| 100μF Capacitor | C9 |
| 10μF Capacitor Tantalum | C10 |
| Red LED | D1 |
| BZX79/C8V2 | D3 |
| IN4148 diode | D4 |
| MC68HC705C8 | U1 Micro-Controller |
| Z85C3010PSC | U2 Serial Controller |
| ICL232CPE | U3 TTL to RS232 |
| MC74HC04 | U4 Clock |
| LM350 | U5 Voltage Regulator |
| LM7805 | U6 Voltage Regulator |
| ULN2003 | U7 7 Pin output, 16 pin, Peripheral driver array |
| U8MC68HC705C8S | U8 EEPROM |

FIG. 6A

| PART DESCRIPTION | PART NUMBER |
| --- | --- |
| 10MΩ Resistor | R1 |
| 100KΩ Resistor | R2 |
| 10KΩ Resistor | R3 |
| 10KΩ Resistor | R4 |
| 390Ω Resistor | R5 |
| 390Ω Resistor | R6 |
| 120Ω Resistor | R7 |
| 230Ω Resistor | R8 |
| 10KΩ 8 Pin Sip Resistor | R9 |
| 2k7Ω 8 Pin Sip Resistor | R10 |
| 1kΩ Resistor | R13 |
| 2k7Ω Resistor | R15 |
| 2k7Ω Resistor | R12 |
| 2k7Ω Resistor | R11 |
| 10kΩ Resistor | R14 |
| 10KΩ Resistor | R16 |
| Mom On Switch | S1 |
| DPDT Latching Relay | S2 |
| 2N3565 NPN | T1 |
| BD677 NPN Transistor | T2 |
| BD680 NPN Transistor | T3 |
| 2.4576 Mhz Crystal | Y1 |
| 3V Lithium Battery | B2 |
| Heat Sink for LM350 | on U5 |

FIG. 6B.

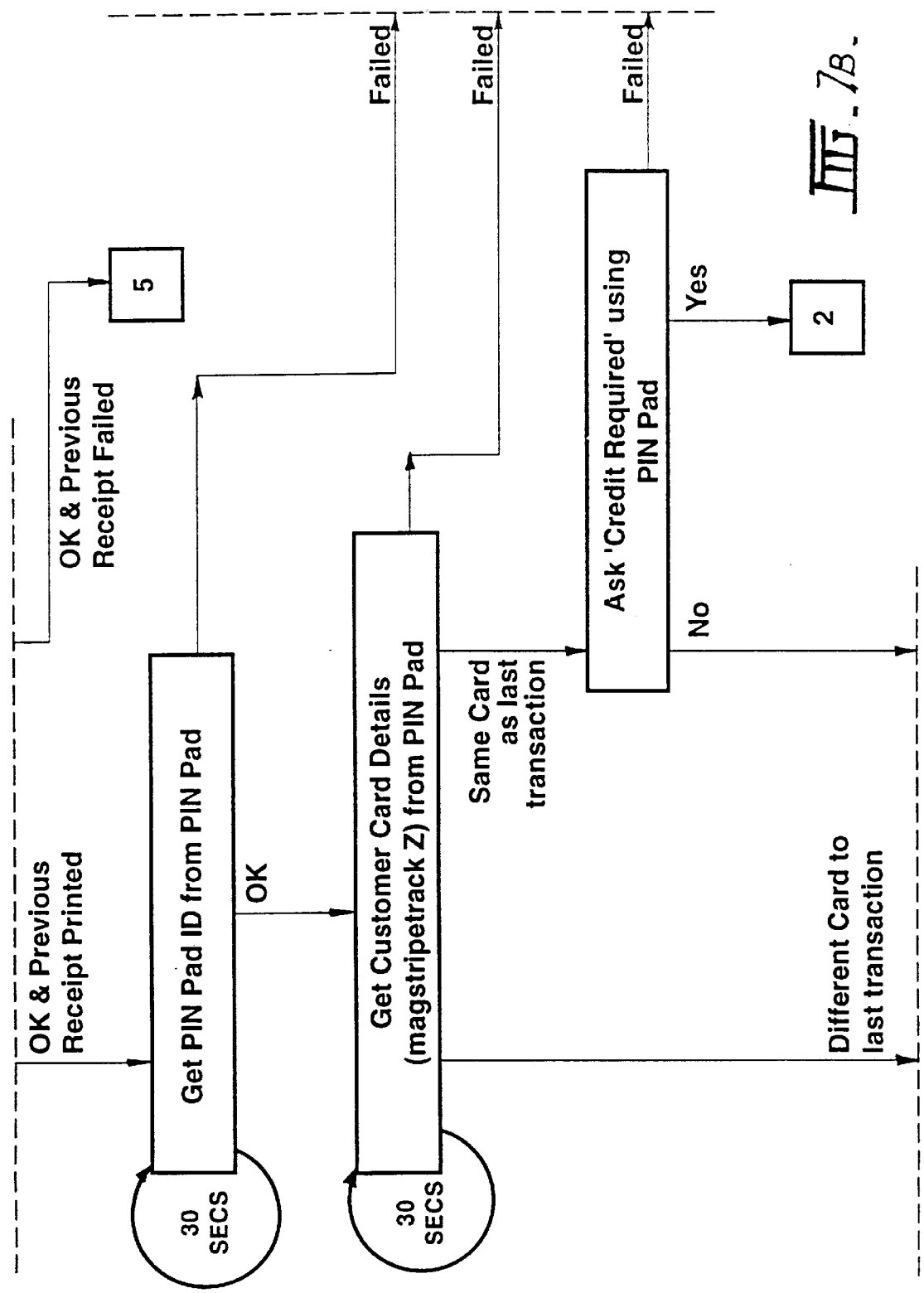

MOBILE FUNDS TRANSACTION DEVICE FOR TRANSFERRING FUNDS BETWEEN REMOTE BANKING FACILITIES

FIELD OF THE INVENTION

This invention relates to a funds transaction device and relates particularly but not exclusively to one which may be mobile and operated via a mobile telephone service.

DESCRIPTION OF PRIOR ART

Automated teller machines and EFTPOS (Electronic Funds Transfer Point of Sale) terminals have operated for many years. All current EFTPOS devices function in the same manner. An EFTPOS card is "swiped" through the device to obtain account details, then an account type and P.I.N. (personal identification number) are entered and the information is sent to the banks for electronic authorisation. The aforementioned information is processed through a PINpad which encrypts the P.I.N. details for data security. The data is sent via a modem through specialised phone lines (leased lines that have a permanent connection) to a transaction switching network where it is "switched" through the correct bank's host computer to obtain bank authorisation. In Australia, the system operates on Australian Telecom's Tran$end network.

The known systems offer many disadvantages. In particular, the ability to have credit transfers from one account to another, such as from a customer's account to a store-holder's account who operates the EFTPOS device is currently limited to a fixed in-store situation and is therefore not practical for on-site tradespeople, market store holders or the like as it is not possible to have the necessary Tran$end leased lines at the various sites where the transaction is to occur for such persons.

OBJECT AND STATEMENT OF THE INVENTION

It is therefore an object of the present invention to overcome the aforementioned problem.

Therefore in accordance with a first broad aspect of the present invention there may be provided a funds transaction device for transferring funds between one bank account or credit facility and another bank account or credit facility said device having:

1. A card reader device;
2. A PINpad device with an encryption system;
3. A modem device;
4. A communication interface device connected with the modem device;
5. An output report device;
6. A communication device; and
7. A central processing device;

said central processing device (CPU) interconnecting all of the devices 1 through 6, said communication device, in use, being connectable with a communications network to connect to a host EFTPOS type network connected with a bank or credit establishment, said CPU being programmed to store merchant identifying data of the owner/leasee of the device and to activate said PINpad device so a user can enter information via said PINpad device such as, account type, account transaction type, transaction amount, and a PIN number with said PIN number being encrypted by said PINpad device, and wherein said PIN number is encrypted and said user entered information encrypted as a Message Authentication Code and stored by said CPU, activate a communication connection via said modem device and said interface device to connect with the host EFTPOS device and transmit the stored user entered data as well as transmit the merchant identifying data of the owner/leasee of the device, so that funds can be transferred from the user's bank account or credit or debit card to the owner/leasee's bank account or vice versa and to provide signals to the output report device confirming the transaction or denial of the transaction or other information relating to the transaction.

Most preferably, the communication device for communication with the host EFTPOS device is a mobile telephone system. It is particularly preferred that a mobile telephone be built into the device. It is particularly preferred that the mobile telephone is dedicated to the purposes of communicating with the host EFTPOS network and is without the usual microphone or earpiece associated with a telephone handset.

In accordance with a further broad aspect of the present invention there may be provided a method of permitting a funds transaction between one bank account, and another bank account, said method comprising storing account data of one party to the transaction, and storing account data of the another party to the transaction by entering transaction particulars via a PINpad device such as account type, account transaction type, transaction amount, and PIN number encrypting the PIN number and storing those particulars as an encrypted Message Authorisation Code, communicating with a host EFTPOS type network and transmitting the stored Message Authorisation Code and data of the one party transferring funds from one party's bank account to the other party's bank account or vice versa and confirming via the output report device the transaction or denial of the transaction or other information relating to the transaction.

With such a device a person effecting a transaction need not be connected directly to a telephone land line such as a Tran$end phone line which is usually not available in person's homes where trades people may require to make a transaction or at market stall locations where market stall holders or operators require to make a transaction.

BRIEF DESCRIPTION OF THE DRAWINGS

In order that the invention can be more clearly ascertained, an example of a preferred embodiment will now be described with reference to the accompanying drawings wherein:

FIGS. 6A and 6B show tables of component types and values in the circuitry shown in FIGS. 5A and 5B;

FIGS. 7A to 7F are flow diagrams showing functionality of the software in the central processing unit circuit board.

Referring now to FIGS. 1 and 2, there is shown a mobile funds transaction device 1. The device 1 is arranged to fit within a carry-case 3. The carry-case may have a shoulder strap 5 and a cover or lid 7 which may be retained relative to the case 1 to close the case 1 by a suitable fastening means 9. The device 1 has a housing 11 which contains the electronic circuitry for the device 1. An output report device 13 in the form of a printer is mounted on the housing 11 as shown. The output report device 13 has an output slot 15 though which paper can issue providing a report on the transaction which has occurred or other information relating to the transaction. A PINpad device 17 connects with the circuitry within the housing 1 by means of a cable 19. The PINpad device has a series of key pads 21 by which a user may enter transaction particulars and it also has a visual display 23 through which messages or instructions may be given. The PINpad device 17 also has a card slot 29 in which a user's card 31 may be swiped in order to obtain particulars from the user's card. A card reader device within the card slot 29 is provided within the PINpad device 17 so as to read particulars from the user's card 31 swiped through the card slot 29. The housing 11 contains a communications device in the form of a mobile telephone system 27 as will be explained hereinafter. An aerial 24 extends from the housing 1.

Figure 1:
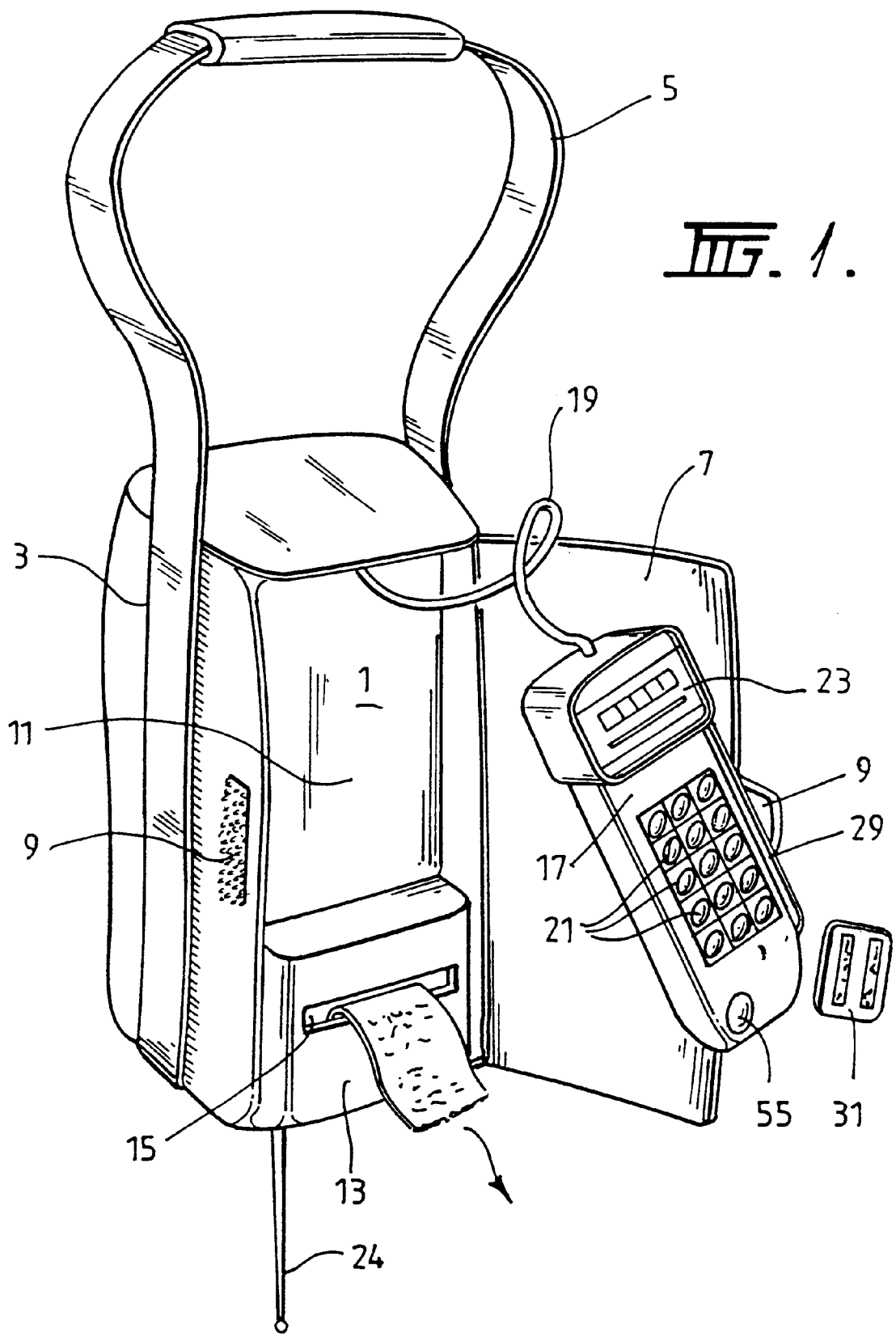
FIG. 1 is a front isometric view of a mobile funds transaction device fitted inside a carry-bag. The carry bag is shown open.

The housing 1, output report device 13, PINpad device 17 and mobile phone 27 are generally rectangular in shape and the PINpad device 17 can fit to the housing 11 so that it is generally occupying the available space on a front face of the housing which is not covered by the output report device 13. A battery compartment 25 is provided at the side of the housing 11 and may, in fact, form an integral part of the housing 11. Thus, it can be seen that the device 1 has the same general size as a mobile telephone 27 except that it is generally thicker to accommodate its own internal central processing unit circuitry, the output report device 13 and the PINpad device 17. The PINpad device 17 is removable for easy access by users.

Figure 2:
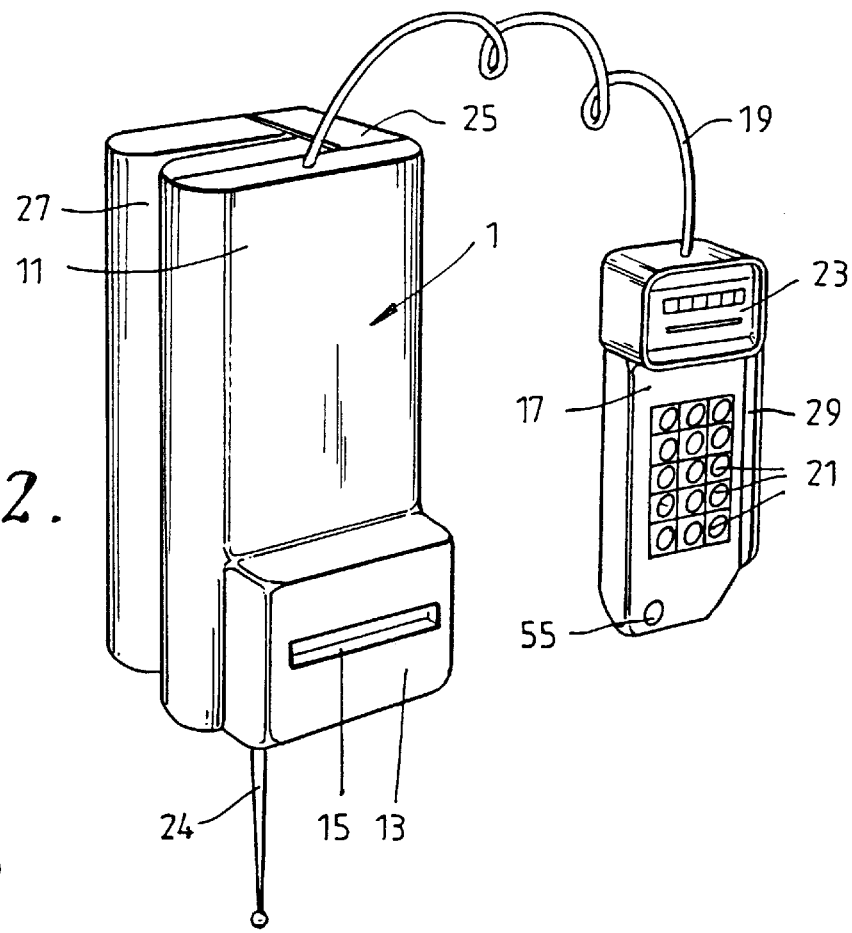
FIG. 2 is a front isometric view of the device removed from the carry-bag.
Figure 3:
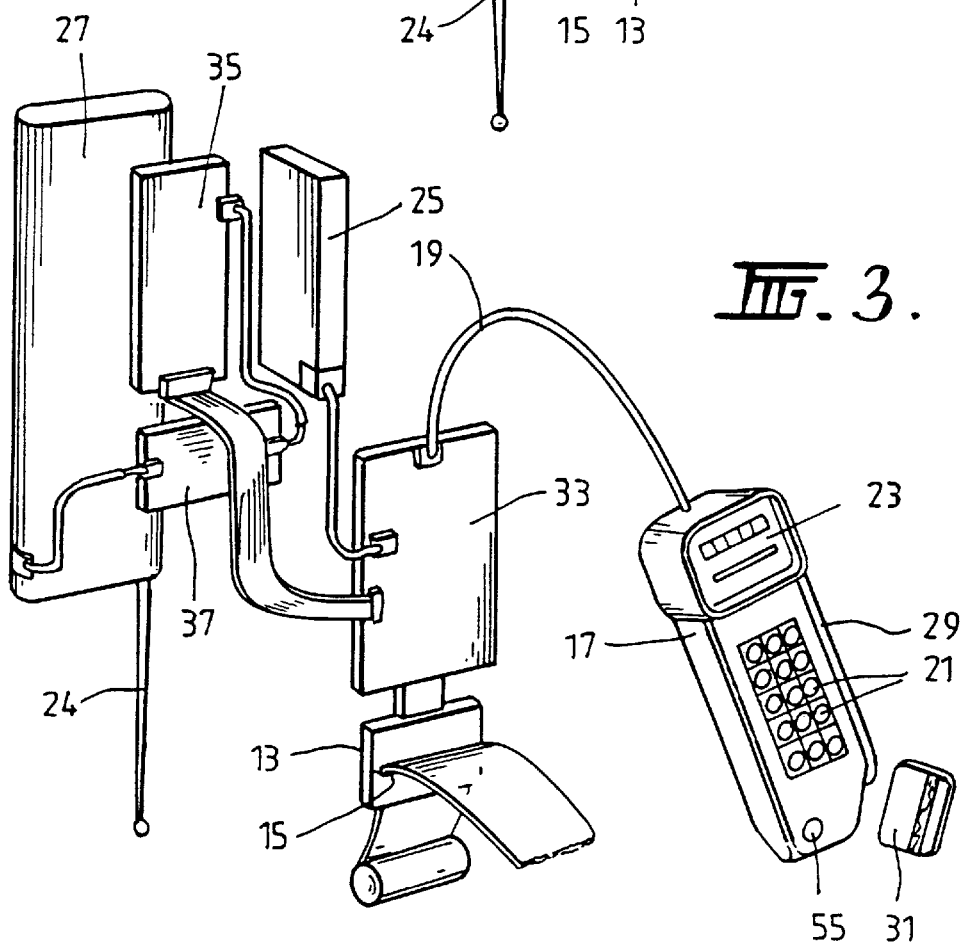
FIG. 3 is a diagrammatic view of the internal componentry of the device.

FIG. 3 shows the arrangement of the various componentry within the housing 11. Thus, like components to those shown in FIGS. 1 and 2 have been provided with the same numerical designations. The circuitry within the housing 11 includes a central processing unit (CPU) board 33 having an EEPROM memory connected therewith, a modem 35, and an interface 37. Preferably the battery 25 is an elongate flat battery.

Figure 4:
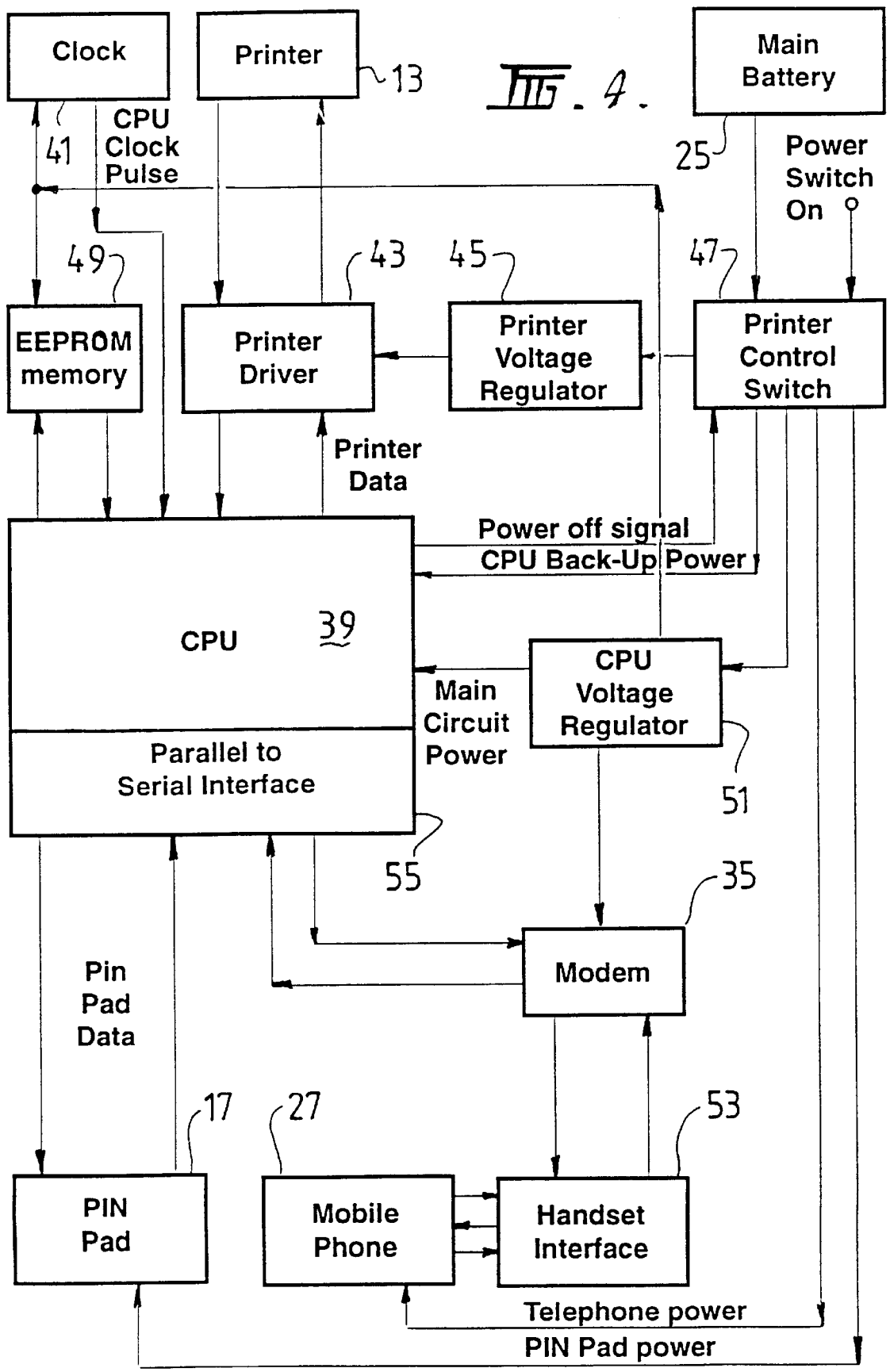
FIG. 4 is a block circuit diagram of the device.

FIG. 4 shows the block circuit diagram of the device with the printer 13, PINpad 17 and mobile phone 27 all interconnected with a central processing unit 39 forming part of the central processing unit board 33. The central processing unit 39 has an EEPROM memory device 49 connected therewith. The central processing unit 39 also has connected to it a clock 41, a print driver circuit 43, a printer voltage regulator circuit 45, a power control switch 47, the main power battery 25 and a EEPROM chip 49. The EEPROM chip 49 is provided to store certain information in memory in the CPU 39. The CPU 39 also has a voltage regulator circuit 51, a modem 35 and a handset interface 53 connected therewith and is also provided with a parallel to serial interface 55 which converts parallel data to serial data for transmission over the modem 35 and mobile phone 27. It also permits data from the PINpad to be transferred to and from the CPU 39.

The mobile phone 27 may be any commercially available mobile phone such as Motorola type 3194 cellular phone. The modem 35 may be any suitable commercially available modem such as modem type ICM supplied by Banksia Technologies of 205/83 Longveville Road, Lane Cove, New South Wales, Australia. The PINpad 17 may be any suitable commercially available PINpad device with encryption circuitry, display 23 and card slot 29 with suitable card reader, such as one manufactured by Trac Systems Australia of 1/61 Lawrence Drive, Nerang, Queensland, Australia and sold under model TSPO21. The output report device may be a suitable printer such as model M-180 manufactured by Seiko Epson Corporation. The handset interface 53 may be a suitable interface such as one sold by Motorola and useable for modem connection with a mobile or other communication device.

The funds transaction device 1 has the CPU board 33 suitably programmed to initiate the necessary procedures for the funds transfer, before, during and after connection with a host funds transfer network. Such communication may be by the mobile phone 27 or by other communication means.

In use, the device 1 is activated so the user's card 31 can be swiped through the card slot 29 so that account details on the card 31 can be read by the card reader device. The CPU board 33 then indicates via the display 23 that the user may manually enter their account type, account transaction required, and amount of transaction, and the personal identification number (PIN) via the key-pads 21. The PIN number is encrypted from the PINpad and with the other non encrypted user entered data is sent back to the PINpad 17 from encapsulating of the data into an encrypted MAC (Message Authentication Code) or the like as required by Australian Standard 2805.3 via the internal encryption circuits within the PINpad device 17. The CPU 1 then stores the MAC within the EEPROM memory chip. This information is retained in an encrypted form. The CPU 33 then initiates a dialling sequence via the modem 35 to effect communication with the host EFTPOS network. This, in turn, activates the mobile phone 27 to make the necessary dialling connections. The handset interface 53 enables the data to be converted to appropriate signals for the mobile phone and also allows for signals received by the mobile phone to be appropriately converted to be fed through the modem and processed by the CPU. When connection is made with the host EFTPOS network and any particular bank required for the transaction to occur, the transaction details are dispatched including the merchant owner/leasee's particulars. The transaction request from the device 1 is then processed by the bank and a reply generated and communicated back to device 1. The CPU 33 receives that reply and an appropriate receipt is generated through the output report device 13. The output from the output report device 13 may be a receipt or a message stating financial institution rejection or other information. The printing of the report by the output report device 13 may be either whilst the device 1 is connected with the host EFTPOS network or after termination of connection.

The central processing unit 33 is pre-programmed for four different receipt types from the output report device 13. These are as follows:

1. Debit Approval—stating card number, account type and amount of transfer;
2. Credit Approval—as in 1. but also requiring signature on receipt;
3. Denial of the Transaction—stating financial institution rejection;
4. Can't Connect—stating there is a problem connecting with either the host EFTPOS device or the transaction switching network such as the mobile telephone service.

Once the appropriate message has been provided by the output device 13 or display 23, the CPU 33 will be programmed to de-activate the circuitry until it is further switched on for a subsequent transaction.

The CPU 33 may be suitably programmed to store transaction amounts so that the merchant owner/leasee of the device 1 can periodically print a journal/result for administration purposes.

The telephone numbers for connecting with the EFTPOS funds transaction network may be manually pre-set in the memory of the CPU 33 by the merchant owner/leasee or may be embedded into either the CPU or, alternatively, mobile phone 27 at the time of manufacture. The EEPROM chip 49 is provided to hold any volatile details in memory in CPU 33. The battery 25 may typically be a rechargeable battery providing sufficient capacity to operate the device 1. A connection may be provided to permit charging of the battery 25 from either mains or from a car battery. A plug connection (not shown) may also be provided to permit external power to be supplied to operate the device if necessary. A telephone plug socket may be provided to permit direct connection to a public service telephone network in areas where the mobile phone may not operate. In this way, the device 1 may be connected with a host EFTPOS network via the normal public service telephone network rather than by the mobile phone 27.

The PINpad device 17 will acquire the transaction data from the user as follows:

An initial swipe of the user's credit/debit card may activate the circuitry in the CPU for subsequent functions of the device 1. Account details can be acquired from the user's credit/debit card and also the expiration date. The personal identification number can be inputted through the key pads 21. The amount of the transaction can also be inputted through the key pads 21. The account type can also be inputted through the key pads 21. The account type might be cheque, savings or other account. The account transaction may be credit or debit. The necessary inputted information is encrypted by the PINpad device 17 in accordance with the Australian standard AS2805.3 previously referred to. The merchant owner/leasee of the device 1 can have his account details or other'details suitably stored in the memory of the central processing unit 33. This account information need not be encrypted. A routine may be provided in the programming of the device 1 for the merchant owner/leasee to input his account information into the memory in the central processing unit 33. This information can be retained for transmission with each transaction. In an alternative arrangement, the merchant owner/leasee may have an account card which must also be swiped through the card slot 29 to extract the owner/leasee's account particulars. If the merchant owner/leasee's account particulars are obtained in this way, then the information may be encrypted by the encryption circuitry resident in the PINpad device 17.

Figure 5A:
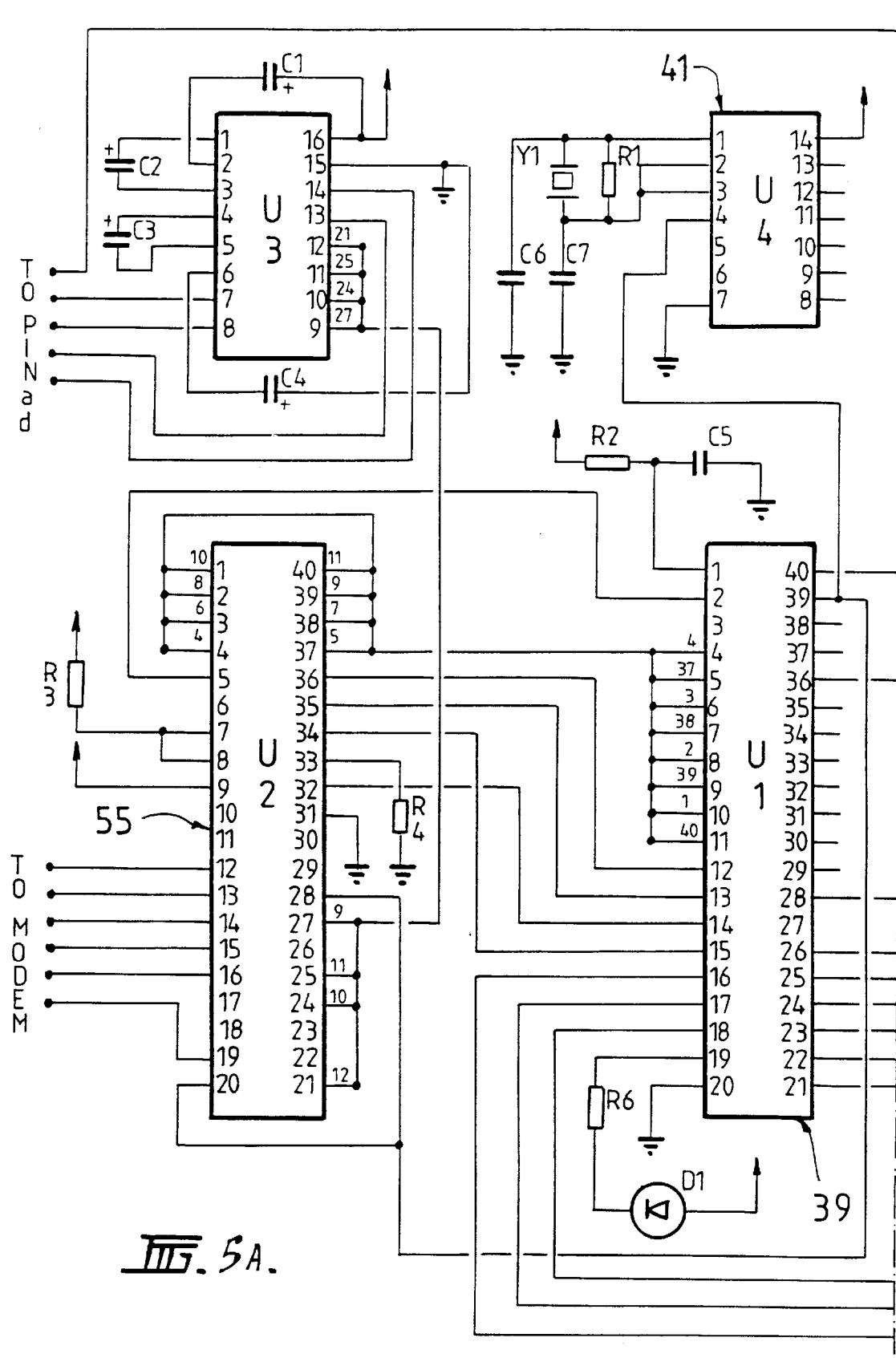
FIGS. 5A, 5B and 5C are detailed circuit diagrams of a central processing unit circuit board used in the device.
Figure 5B:
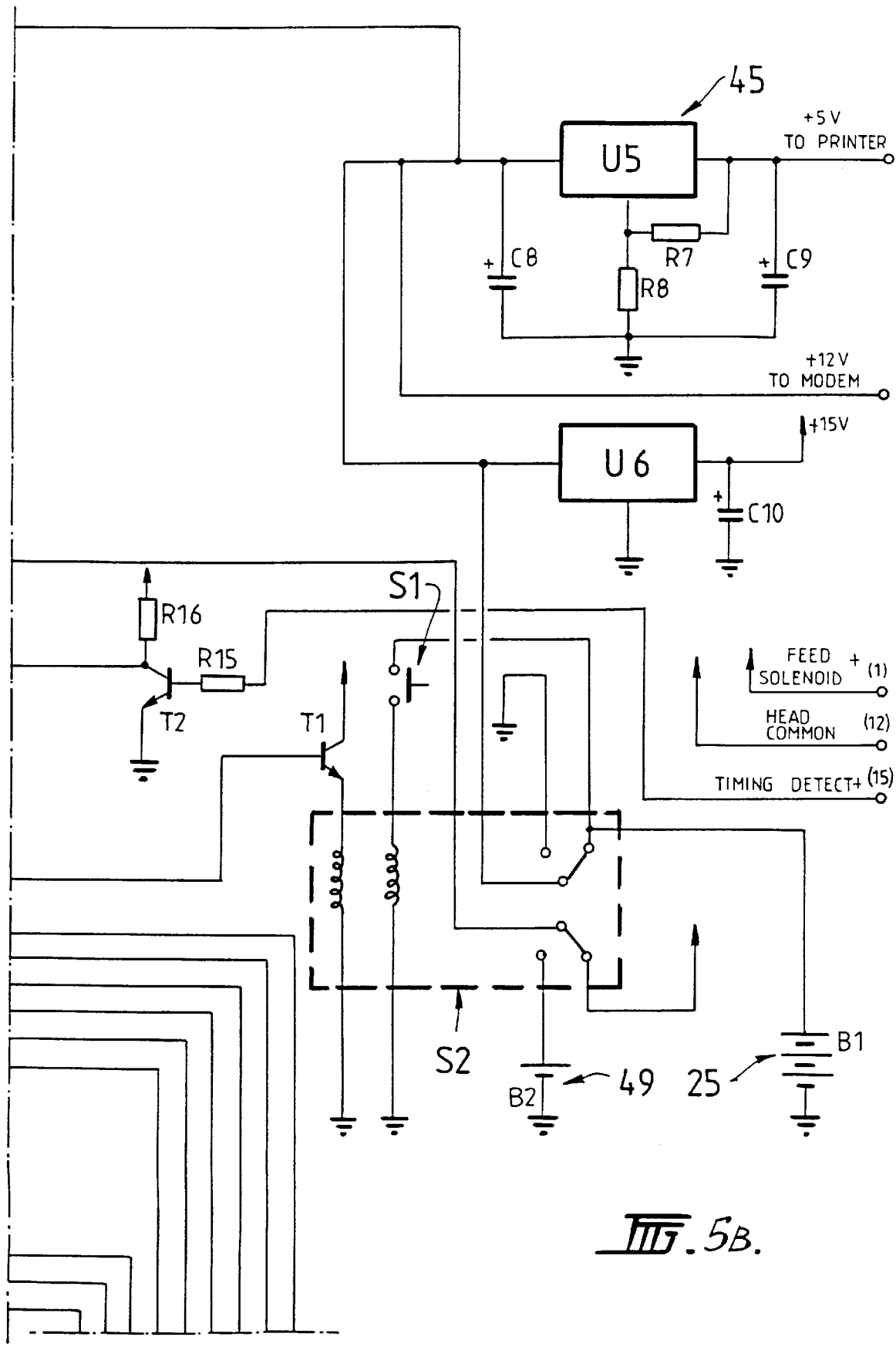
Figure 5C:
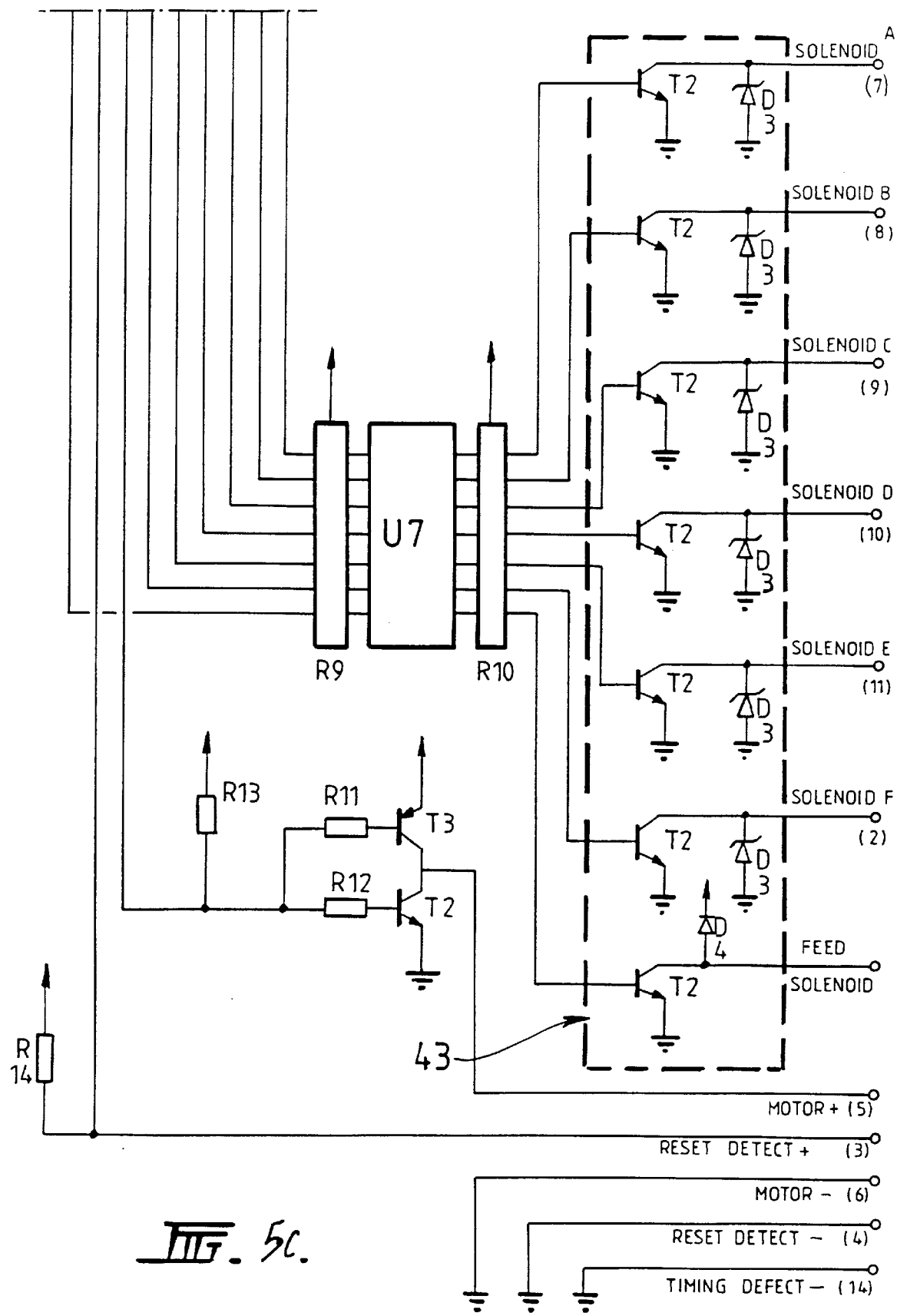

Referring now to the detailed circuit diagram of FIGS. 5A, 5B, and 5C and to the componentry identified in the schedule of FIGS. 6A and 6B it can be seen that the battery 25 is arranged to make electrical connection with the circuitry through a latching relay switch S2. The latching relay switch S2 is, in turn, activated by operation of a "momentarily on" switch S1. The switch S2 is shown in the power on position for taking power from the battery 25. A transistor T1 is connected with U1 and can provide drop out of the latching relay S2 so that when a signal is supplied to transistor T1 identifying that the transaction has been completed, it automatically turns off the latching relay S2 to conserve the battery.

The circuitry shows an error indicating LED diode D1 which is coloured red. The CPU 33 is arranged to activate D1 if a major fault occurs with the functionality of the device, thus requiring repair. All other errors are displayed on the PINpad 17.

The memory in the CPU 33 is preferably partitioned to store several alternative EFTPOS network telephone numbers, and wherein the program is arranged to attempt to make connection on one number and if that is unsuccessful to attempt to make connection on another of the numbers without intervention by the user.

The circuitry should otherwise be self-explanatory to an electronics engineer.

Figure 7A:
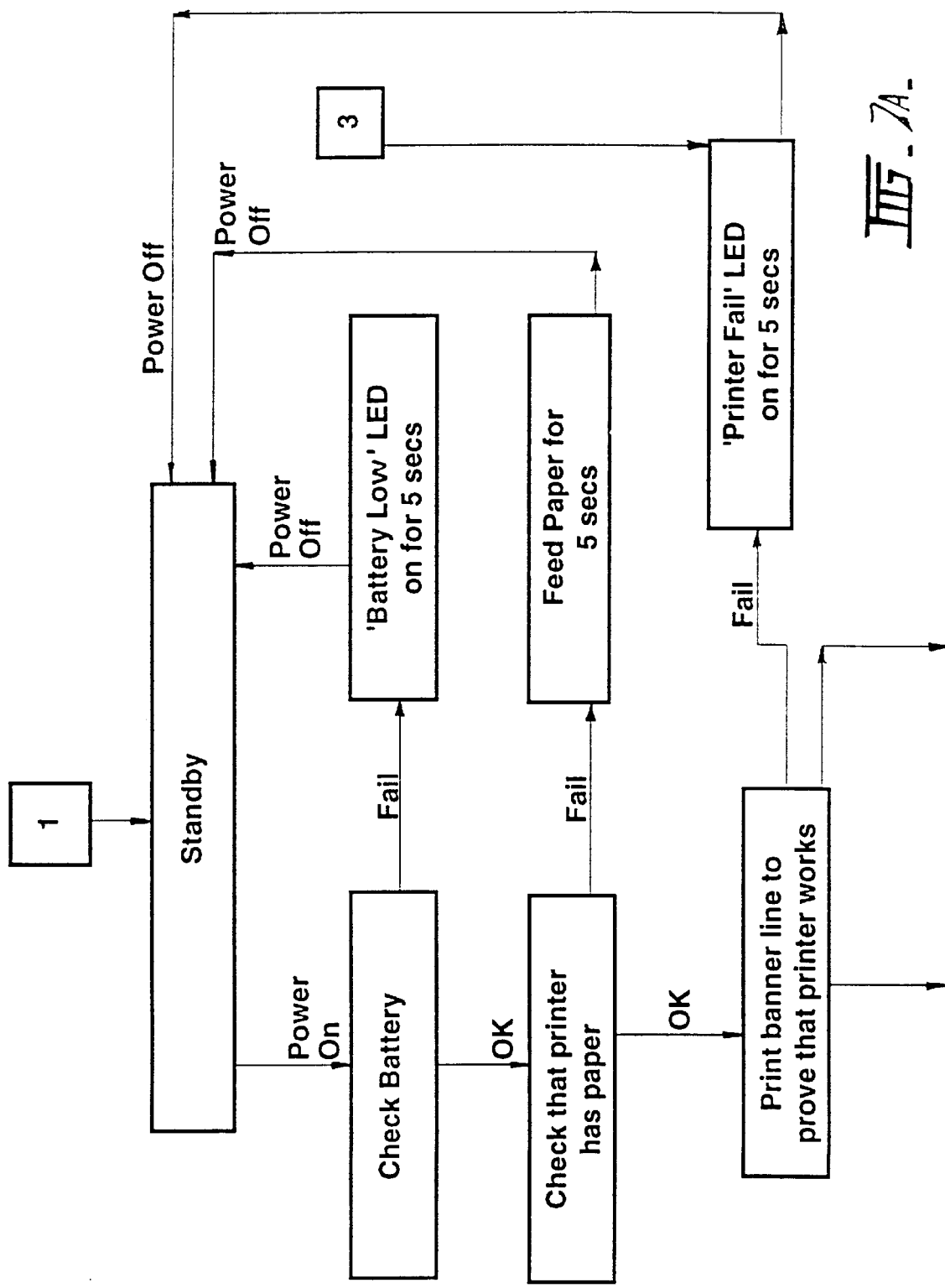
Figure 7C:
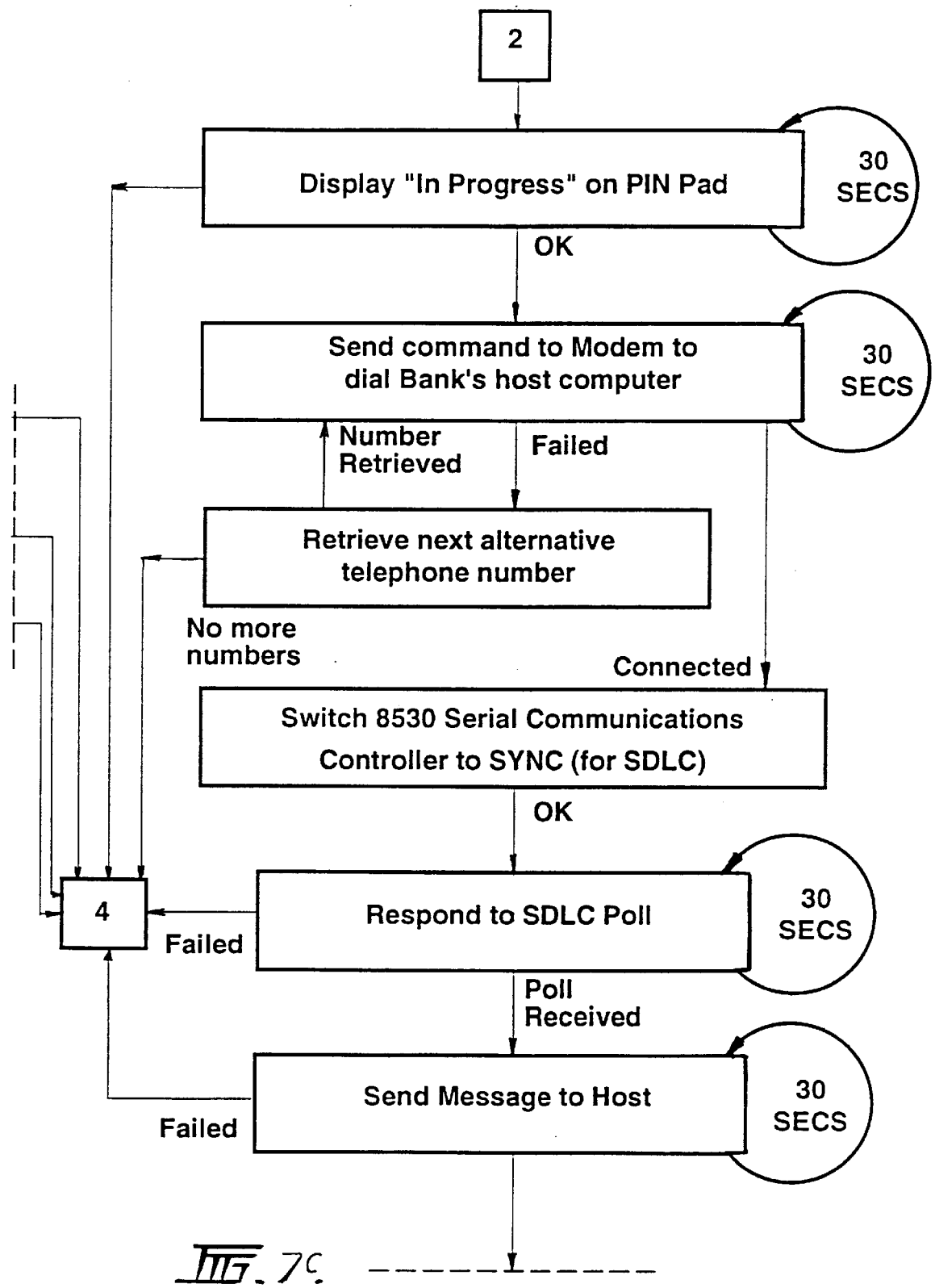
Figure 7D:
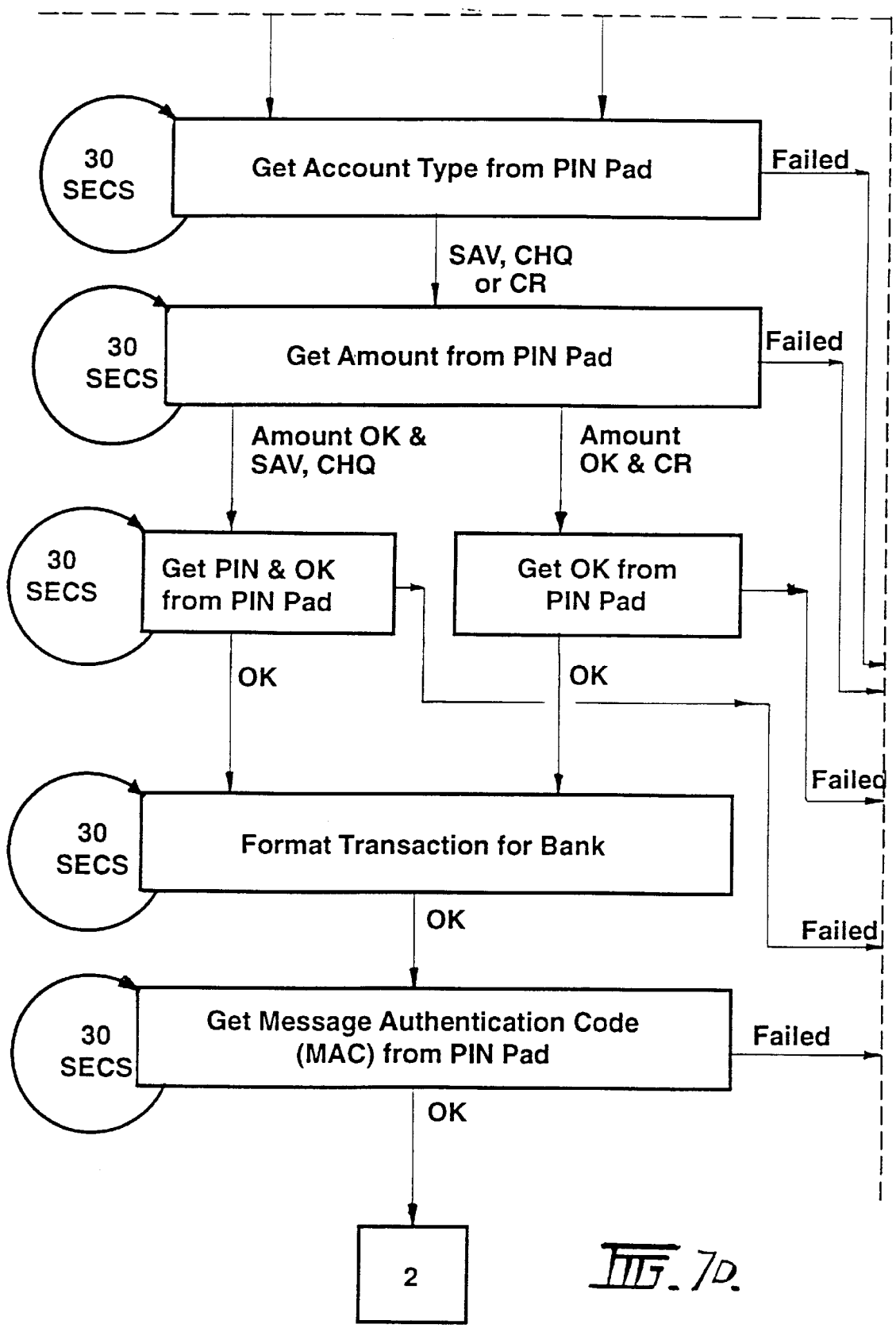
Figure 7E:
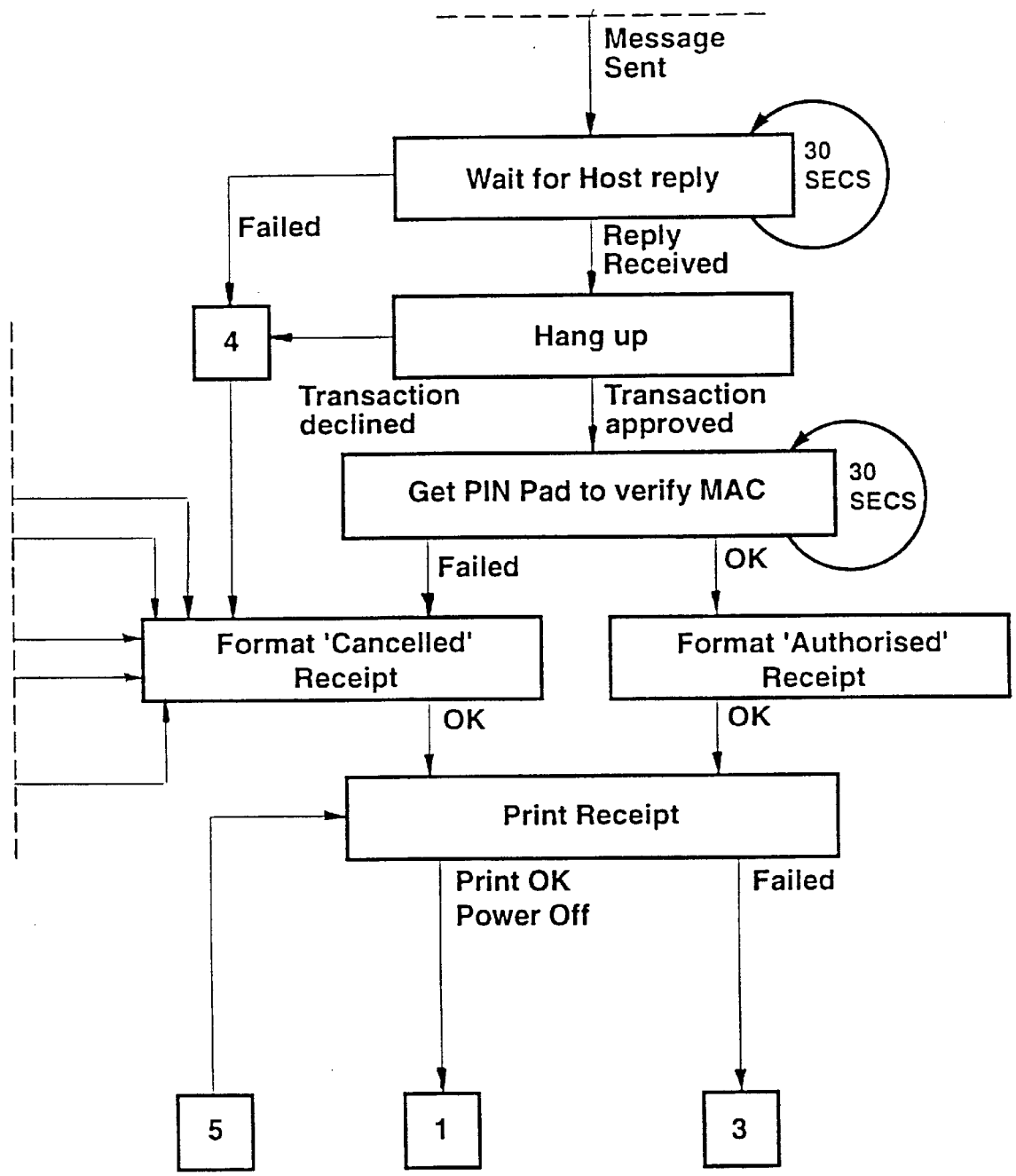

Referring now to FIGS. 7A, 7B and 7C there is shown a program flow-diagram outlining the sequence of events for a transaction. The diagram is self-explanatory.

It should be appreciated that many modifications may be made to the present invention as would be apparent to persons skilled in the banking and/or EFTPOS transaction arts. For example, it may be desirable for commercial manufacturing enhancement to place the CPU, modem, interface, battery voltage controller and printer card on a single circuit board. Also, the swiping of the user's card through the slot 29 may not activate the switch S1 which connects the battery 25 with the CPU circuit 33. A switch S1 which is diagrammatically shown as pin 55 in FIGS. 1 through 3 may be used so that the device can be manually switched on.

Further, instead of the device operating by a telephone communication link with the host EFTPOS network it may operate via any suitable communications link which results in the device not being permanently physically electrically connected therewith such as by the usual Tran$end lines previously referred to.

These and other modifications may be made without departing from the ambit of the invention, the nature of which is to be determined from the foregoing description.

I claim:

1. A mobile funds transaction device for transferring funds between one bank account or credit facility and another bank account or credit facility, said device having:

1. A card reader device;

2. A PINpad device with an encryption system;

3. A modem device;

4. A communication interface device connected with the modem device;

5. An output report device;

6. A wireless communication device; and

7. A central processing device;

said central processing device (CPU) interconnecting all of the devices 1 through 6, said wireless communication device, in use, being connectable with a wireless communications network to connect to a host EFTPOS network connected with a bank or credit establishment, said CPU being programmed to store merchant identifying data of the merchant owner/lessee of the device and to activate said PINpad device so a user, who is a distinct entity from said merchant owner/lessee, can enter user oriented information via said PINpad device, said information including a PIN number and at least one of, account type, account transaction type, and transaction amount, said PIN number being encrypted by said PINpad device, and wherein said PIN number is encrypted and said user entered information encrypted as a Message Authentication Code and stored by said CPU, activate a communication connection via said modem device and said interface device to connect with the host EFTPOS device and transmit the stored user entered data as well as transmit the merchant identifying data of the merchant owner/lessee of the device, so that funds can be transferred from the user's bank account or credit or debit card to the merchant owner/lessee's bank account or vice versa and to provide signals to the output report device confirming the transaction or other information relating to the transaction;

wherein the mobile funds transaction device is mobile and portable and therefore can be moved from one location to another in view of the wireless communication device to thereby enable the funds transaction device to be used without need to be hard wired into a transmission system; and wherein said communication connection is activated by a telephone dialing routine controlled by the central processing unit, and said communication device is a mobile telephone device for permitting said communication connection.

2. A device as claimed in claim 1 including a memory for storing telephone numbers of host EFTPOS networks.

3. A device as claimed in claim 2 wherein said memory is arranged to store several telephone numbers as alternative telephone numbers for said host EFTPOS network and wherein said central processing unit is programmed to attempt to make connection on one number and if that is unsuccessful to attempt on another number without intervention by a user.

4. A hand held mobile funds transaction device for transferring funds between one facility and another facility, including:

an input unit having;
(a) a card reader for reading data in or on a user's card;
(b) an input pad for the input of data relating to a transaction; and
(c) an output report device for providing details of the transaction;

coupling means for electronically coupling the input unit to a wireless communication device;

wherein the input device, in use, provides an information signal including data relating to the transaction, which includes a PIN number input by a purchaser, and data relating to the merchant owner/lessee of the transaction device so that said coupling means can transfer the information signal to the wireless communication device so the wireless communication device can, in turn, transmit the signal to a central facility to cause funds to be transferred from said one facility relating to the user, who is a distinct entity from the merchant owner/lessee, and to said another facility relating to the merchant owner/lessee, and wherein the funds transaction device is mobile and portable and therefore can be moved from one location to another in view of the coupling means which couples the input unit to the wireless communication device to thereby enable the funds transaction device to be used without need to be hard wired into a transmission system;

wherein said wireless communication device includes a mobile telephone;

wherein said coupling means includes a modem device, a communication interface device coupled to said modem device, a central processing device, and a cable for coupling said modem device, said communication interface device and said central processing device to said wireless communication device.

* * * * *